(12) United States Patent
Leahy et al.

(10) Patent No.: US 9,020,336 B1
(45) Date of Patent: Apr. 28, 2015

(54) DIGITAL STREAK CAMERA WITH ROTATING MIRROR

(75) Inventors: Ronald S. Leahy, Jarrell, TX (US); Joseph W. Ovellette, West Jordan, UT (US); Steve H. Holtman, West Bountiful, UT (US); William L. Larkin, Salt Lake City, UT (US)

(73) Assignee: Cordin Company, Inc., Salt Lake City, UT (US)

( * ) Notice: Subject to any disclaimer, the term of this patent is extended or adjusted under 35 U.S.C. 154(b) by 111 days.

(21) Appl. No.: 13/482,806

(22) Filed: May 29, 2012

(51) Int. Cl.
*G03B 41/00* (2006.01)
*H04N 7/18* (2006.01)
*H04N 5/225* (2006.01)
*H04N 5/247* (2006.01)
*H04N 1/00* (2006.01)

(52) U.S. Cl.
CPC ................................. *H04N 1/00352* (2013.01)

(58) Field of Classification Search
USPC ........... 348/36–39, 143–159, 207.99–207.11, 348/218.1, 222.1, 239, 262–265, 335–369, 348/373–376; 396/322–340
See application file for complete search history.

(56) References Cited

U.S. PATENT DOCUMENTS

| | | | |
|---|---|---|---|
| 6,304,284 B1* | 10/2001 | Dunton et al. | 348/36 |
| 6,335,758 B1* | 1/2002 | Ochi et al. | 348/335 |
| 6,717,608 B1* | 4/2004 | Mancuso et al. | 348/36 |
| 7,557,820 B2* | 7/2009 | Shiraishi | 347/241 |
| 7,679,801 B2* | 3/2010 | Itami | 359/203.1 |
| 7,710,463 B2* | 5/2010 | Foote | 348/218.1 |
| 8,018,489 B2* | 9/2011 | McCutchen | 348/143 |
| 8,072,482 B2* | 12/2011 | Gibbs et al. | 348/36 |
| 8,253,777 B2* | 8/2012 | Lin | 348/36 |
| 8,670,020 B2* | 3/2014 | Kniffen et al. | 348/36 |
| 2004/0061774 A1* | 4/2004 | Wachtel et al. | 348/36 |
| 2004/0263611 A1* | 12/2004 | Cutler | 348/36 |
| 2005/0179807 A1* | 8/2005 | Lin | 348/344 |
| 2006/0072020 A1* | 4/2006 | McCutchen | 348/218.1 |
| 2006/0125921 A1* | 6/2006 | Foote | 348/159 |
| 2006/0221209 A1* | 10/2006 | McGuire et al. | 348/239 |
| 2007/0052815 A1* | 3/2007 | Kondo et al. | 348/224.1 |
| 2007/0146850 A1* | 6/2007 | Olson et al. | 359/206 |
| 2007/0205365 A1* | 9/2007 | Smitt et al. | 250/339.12 |
| 2008/0007710 A1* | 1/2008 | Zambon | 356/5.01 |
| 2008/0068451 A1* | 3/2008 | Hyatt | 348/36 |
| 2008/0111881 A1* | 5/2008 | Gibbs et al. | 348/36 |
| 2009/0194699 A1* | 8/2009 | Smitt et al. | 250/339.12 |
| 2009/0235543 A1* | 9/2009 | Hayashi et al. | 33/293 |
| 2010/0245539 A1* | 9/2010 | Lin | 348/36 |
| 2010/0259629 A1* | 10/2010 | Lo | 348/222.1 |
| 2013/0050488 A1* | 2/2013 | Brouard et al. | 348/144 |
| 2013/0242138 A1* | 9/2013 | Becker-Lakus et al. | 348/239 |
| 2013/0321890 A1* | 12/2013 | ISHIDA et al. | 359/200.7 |

* cited by examiner

*Primary Examiner* — Michael Osinski
(74) *Attorney, Agent, or Firm* — Brian C. Trask

(57) ABSTRACT

A rotating mirror digital streak camera including means to convert an image presented to a roughly cylindrical image plane into a plurality of discrete zones, a sensor being adapted to capture the image data associated with each such zone, and a means to assemble the collected data to reconstruct the original image that is swept across the image plane as an essentially uninterrupted image.

13 Claims, 12 Drawing Sheets

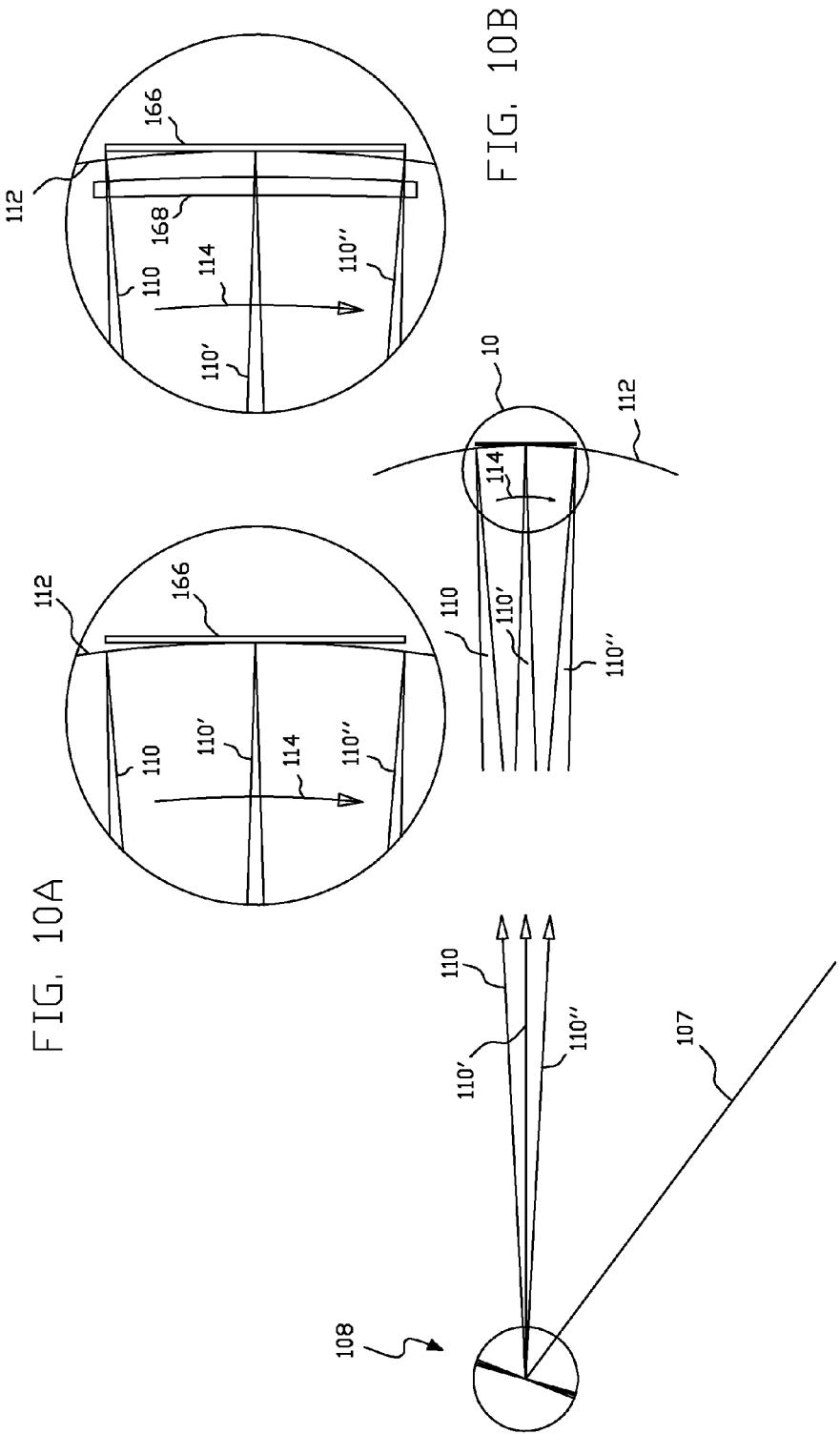

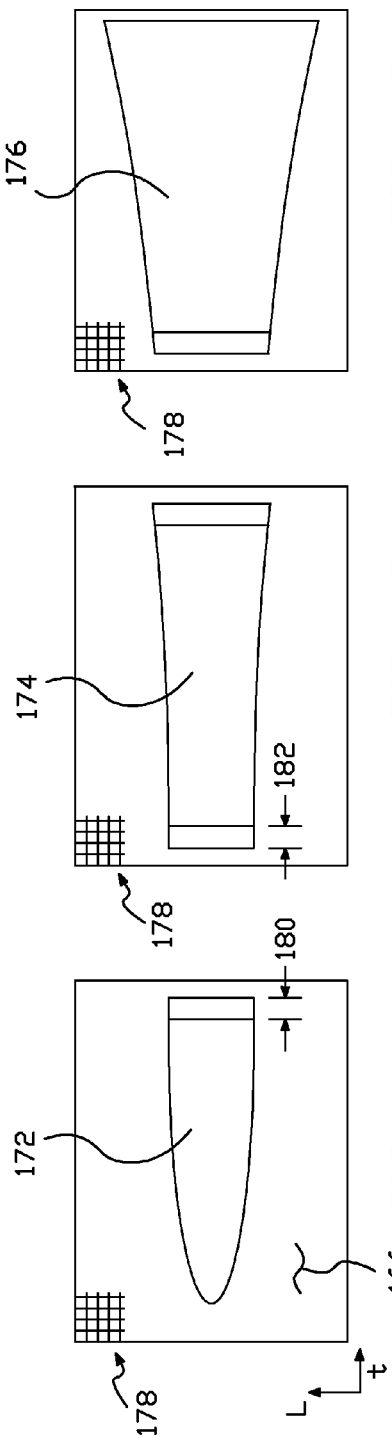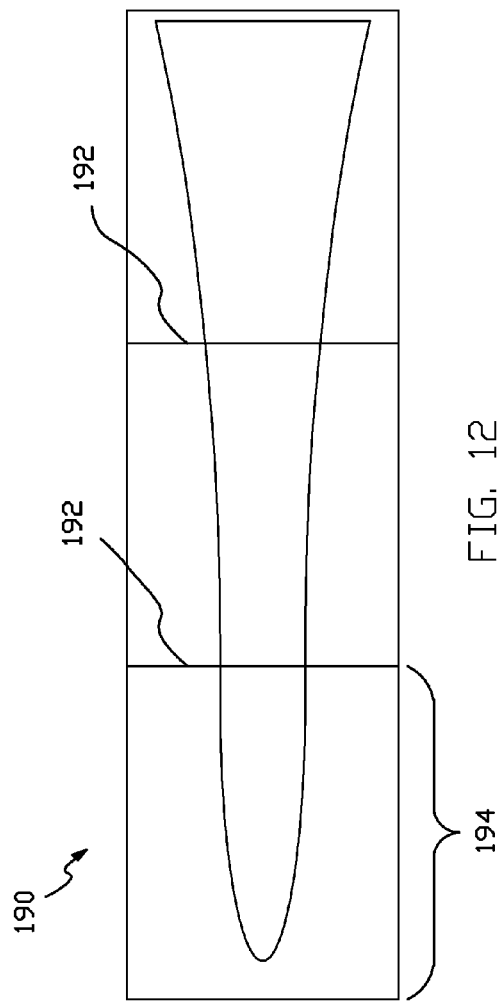

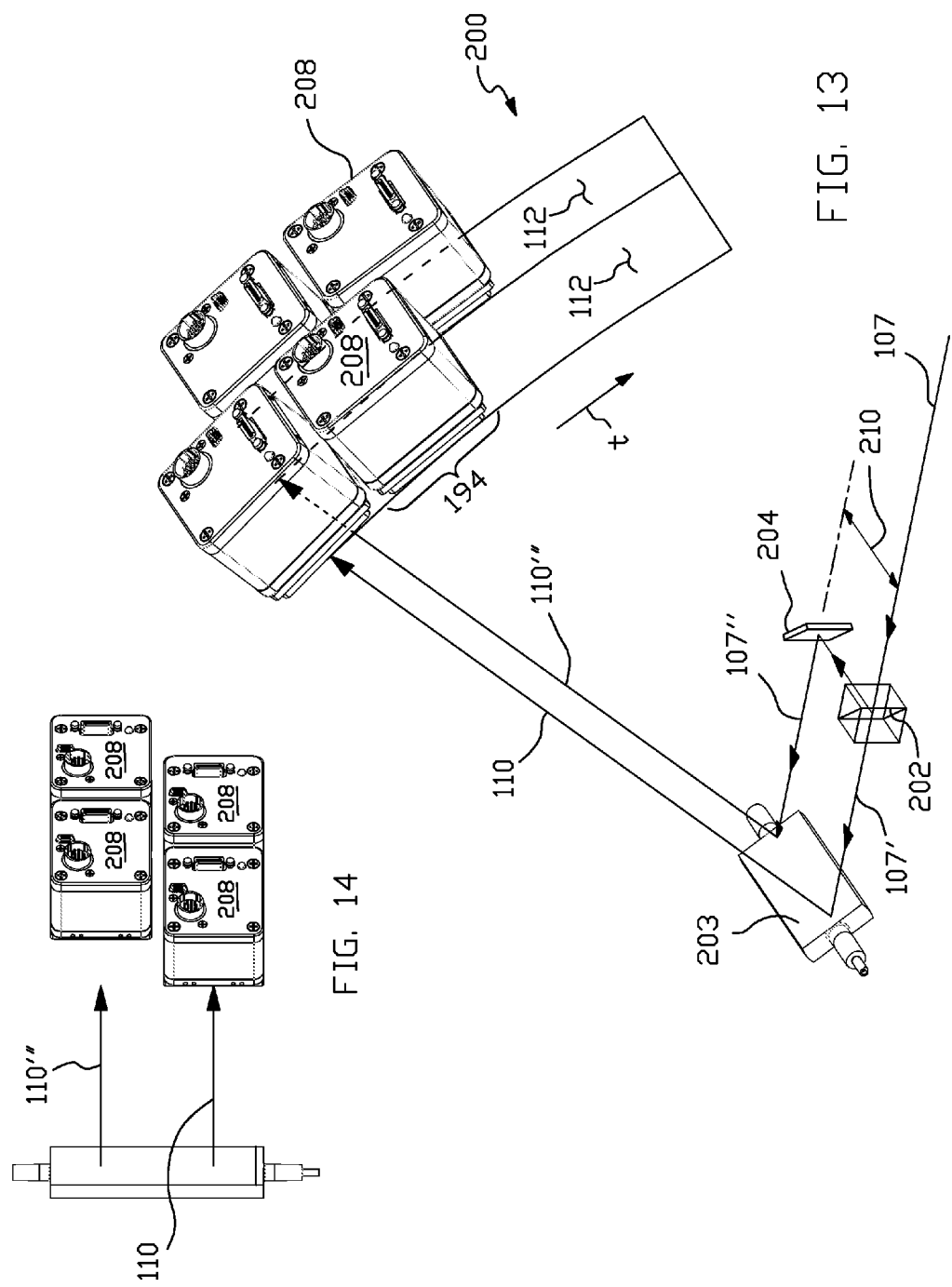

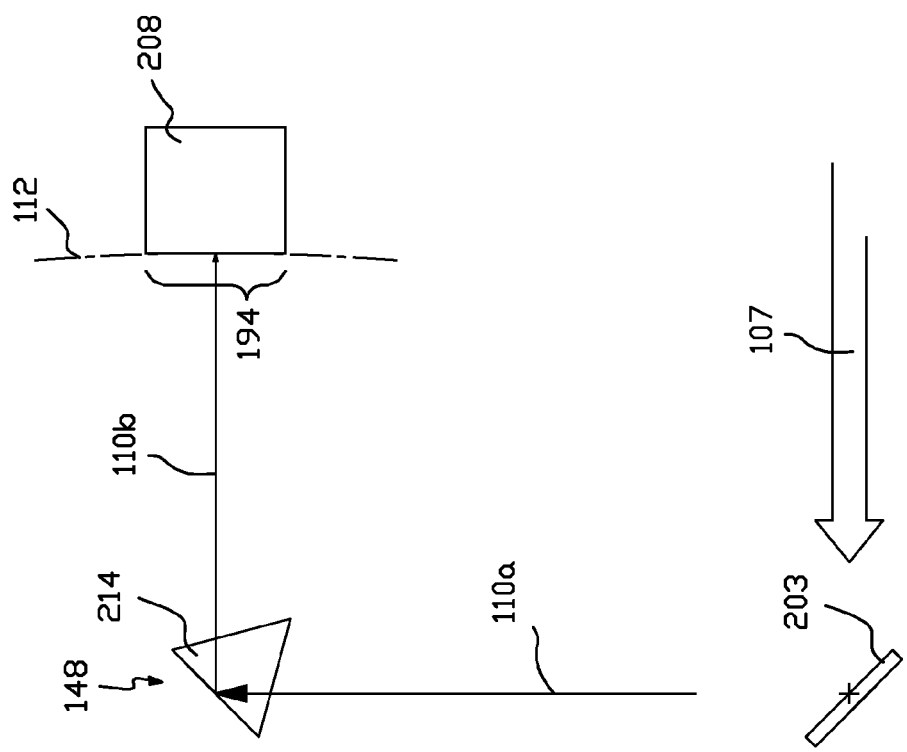

DIGITAL STREAK CAMERA WITH ROTATING MIRROR

BACKGROUND OF THE INVENTION

1. Field of the Invention

This invention relates to image-capturing devices; specifically to rotating-mirror-based streak cameras.

2. State of the Art

Streak cameras capture a thin line view of the subject continuously over time, thereby creating a record of one dimension of space over time. The most common type of streak camera is an image converter based camera, which has the advantage of being able to capture images with extremely high temporal resolution in the picosecond and sub-picosecond domain. It functions by converting incident photons from an image into electrons and then electro-statically sweeping these electrons, and then capturing the resulting transient record.

Another, less common type of streak camera is rotating-mirror based. Rotating mirror streak cameras are an indispensable tool for the diagnostics and analysis of complex, rapidly moving events, including high explosive events. While operating at slower speeds than the image converter cameras, having temporal resolution on the order of nanoseconds or microseconds, they have the advantage of longer record length and significantly higher spatial resolution, on the order of 5,000 picture elements or more. They operate by optically relaying the line image through a very fast rotating mirror, which has an axis of rotation parallel to the line image. The mirror is positioned at a location distant from the focal points of the optical system, which as the mirror turns results in a sweeping of the focused line along a surface that is roughly cylindrical (exactly cylindrical if the thickness of the mirror is neglected). The rotating mirror is then roughly at the center of this cylinder.

The optical design of rotating mirror-based cameras therefore requires the final image plane to be substantially cylindrical. Historically, in the commercial embodiment of these cameras, the image plane was configured to accommodate 70 mm photographic film, which lends itself to forming a near cylindrical shape very easily and can capture the very high spatial and temporal resolution these cameras are capable of producing. During the time that photographic film was the standard for image capture and widely available, this embodiment satisfied the needs of the application of this technology.

Presently, electronic imaging technology has supplanted photographic film. The imaging performance of the highest-end electronic sensors has matched, and in some cases surpassed, that of even 70 mm film in terms of resolution and dynamic range. Commercially available devices based on complementary metal-oxide-semiconductor (CMOS) and charge-coupled devices (CCD) are a viable replacement for photographic film in most imaging applications.

Application of CMOS or CCD technology within a rotating mirror streak camera application is not a straightforward replacement. First, the aspect ratio of the final image plane in a rotating mirror streak camera is highly rectangular. Aspect ratios of 10:1 are typical of records previously captured on film. In contrast, commercially available electronic image sensors can have maximum aspect ratios approaching 3:1. The long axis of certain such sensors can posses sufficient resolution (a sufficient number of sufficiently small pixels) to effectively capture streak propagation in a streak-length direction. However, commercially available sensors simply do not possess sufficient spatial resolution in the short axis to be a viable direct replacement for film. That is, the short axis does not possess sufficient resolution and length to record a continuous streak image for a sufficient length of time.

Second, the image capturing surface of a commercially available electronic image sensor is planar due to conventional and cost-effective fabrication methods. Since the image plane of a rotating mirror streak camera is approximately cylindrical, a simple replacement of the film capturing medium with a single (and currently hypothetical) planar electronic imaging device that does provide the desired aspect ratio in a single sensor would not provide sufficient agreement between the image plane defined by the optics of the camera and the image capturing surface of the hypothetical electronic sensor. Consequently, the image captured by such an image sensor would not be in focus during the entire desired time period.

In theory, a plurality of high resolution commercially available sensors could be placed side-by-side to dispose their short axes in a segmented, generally arcuate path that approximates the image plane of the camera, such that a desired spatial (time) resolution requirement can be met in series. However the image plane is also necessarily continuous. Commercially available electronic image sensors are fabricated with required supporting edge structures that prevent the image-capturing surfaces of two adjacent image sensors to be positioned in perfect abutment. The resulting unavoidable spacing between adjacent image-capturing surfaces makes it impossible to simply place sensors side-by-side in the image plane and thereby capture an image without discontinuities and lost image information.

Furthermore, alternatives to such sensors would be extremely expensive to manufacture in the required arcuate configuration and extended length and width to directly replace the length of film used in a conventional streak camera.

It would be an advance in the field of image capturing to provide an apparatus that can produce a one-dimensional, time-based image as a digital image, with the advantages of immediate availability, easy duplication, modification and analysis, and convenience endemic to digital imaging in general. It would be a further advance to provide an apparatus that incorporates a plurality of commercially available, reasonably priced, image-capturing sensors in an arrangement effective to capture a virtually uninterrupted image from the entirety of an image plane that is at least approximately equivalent in spatial and temporal resolution, and in dynamic range, to a known streak camera adapted to use photographic film.

BRIEF SUMMARY OF THE INVENTION

This invention may be embodied to provide a digital streak camera. Such a camera includes an image-capturing optical arrangement effective to direct a bundle of light toward a focal plane. Also, such camera includes an image relay system effective to sweep the bundle of light to form a continuous, one dimensional or line image as a function of time across an image plane.

One currently preferred embodiment structured according to certain principles of the invention includes optical interruption elements disposed in the optical path that is followed by the acquired light bundle of a digital streak camera. Desirably, such interruption elements are located between a rotating mirror and the final (conventional) image plane, and away from the focal point of the image relay system. Each optical interruption element operates to segment the otherwise continuous conventional image plane, and also redirects the light rays of the light bundle to an alternative position away from the location the conventional image plane would otherwise occupy. For each one of these optical interruption elements, an associated electronic digital image sensor is positioned such that an interrupted segment portion of the conventional image plane, as redirected by the optical interruption element, is at least roughly coincident with the image-acquiring surface of the associated electronic digital image sensor.

This arrangement of optical interruption elements and corresponding image sensors forms a serially sequenced 3-D array of captured images configured such that light that would otherwise fall along the approximately cylindrical conventional image plane is captured by the series of electronic image sensors. Each image sensor captures an interrupted segment portion of a time-based image acquired by the camera.

Further, the arrangement of the optical interruption elements and their associated image sensors is desirably such that for the regions of transition between adjacent sensors, the light bundle transmitted toward the conventional image plane is divided. This division desirably causes the focus point within a transition region to appear simultaneously on adjacent sensors, thereby creating a redundant region of image acquisition that can be used when concatenating the interrupted segment portions into a continuous image.

After impingement of light onto the capture-surface of the electronic digital image sensors, the image acquisition, digitization, data transfer, analysis, manipulation and storage are all conducted with methods and tools similar to tools and methods common to digital imaging.

BRIEF DESCRIPTION OF THE DRAWINGS

In the drawings, which illustrate what are currently considered to be the best modes for carrying out the invention:

FIG. 9 is a schematic ray trace representing operation of a streak camera;

FIG. 10A is a close-up view of the area indicated by numeral 10 in FIG. 9;

FIG. 10B is an alternative construction of the area indicated by numeral 10 in FIG. 9;

FIGS. 11A through C are plan views illustrating consecutive discreet portions of an image plane being captured by a plurality of digital image sensors;

FIG. 12 is a plan view illustrating the concatenated image obtained from FIGS. 11A-C;

FIG. 13 is a view in perspective of an alternative camera arrangement;

FIG. 14 is a top view of the arrangement in FIG. 13; and

FIG. 15 is a side view of an alternative camera construction.

DETAILED DESCRIPTION OF THE ILLUSTRATED EMBODIMENTS

Reference will now be made to the drawings in which the various elements of the illustrated embodiments will be given numerical designations and in which the invention will be discussed so as to enable one skilled in the art to make and use the invention. It is to be understood that the following description is only exemplary of the principles of the present invention, and should not be viewed as narrowing the claims which follow.

Figure 1:
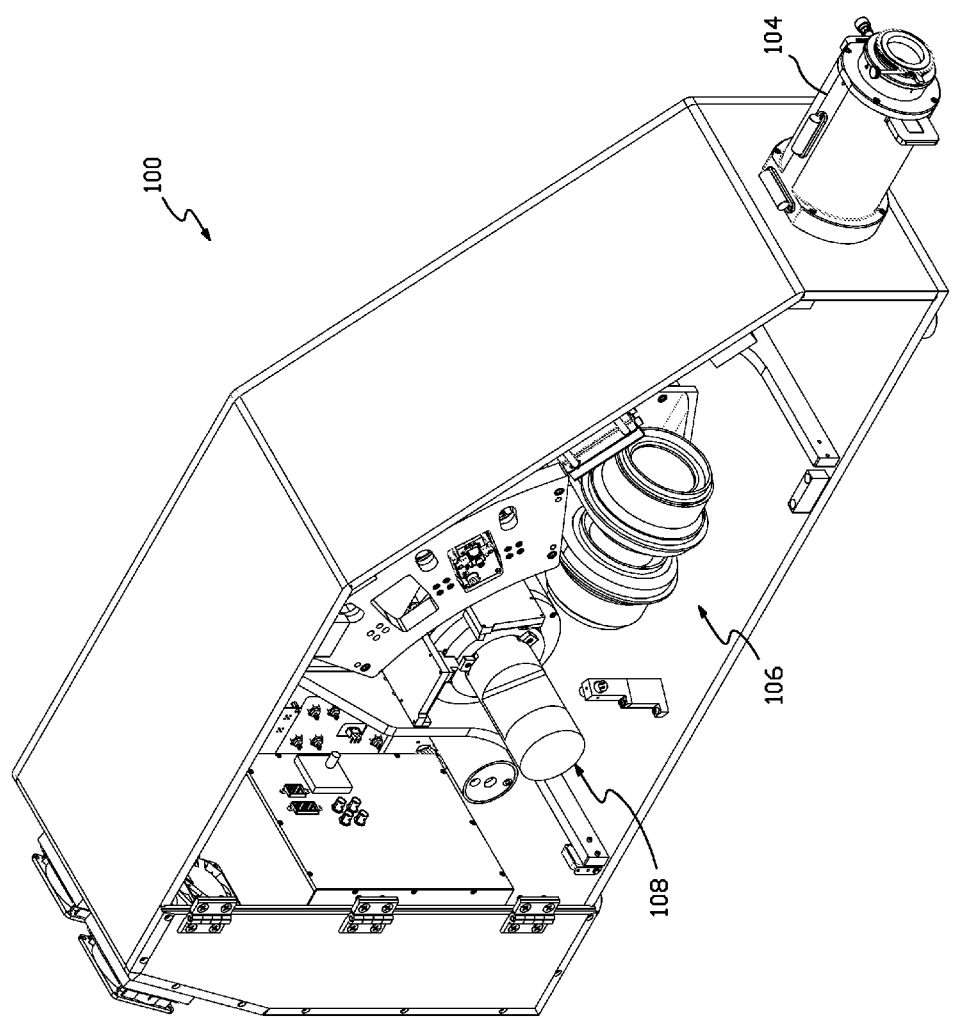
FIG. 1 is a view in perspective of a partially assembled and currently preferred embodiment of a streak camera structured according to certain principles of the invention.
Figure 2:
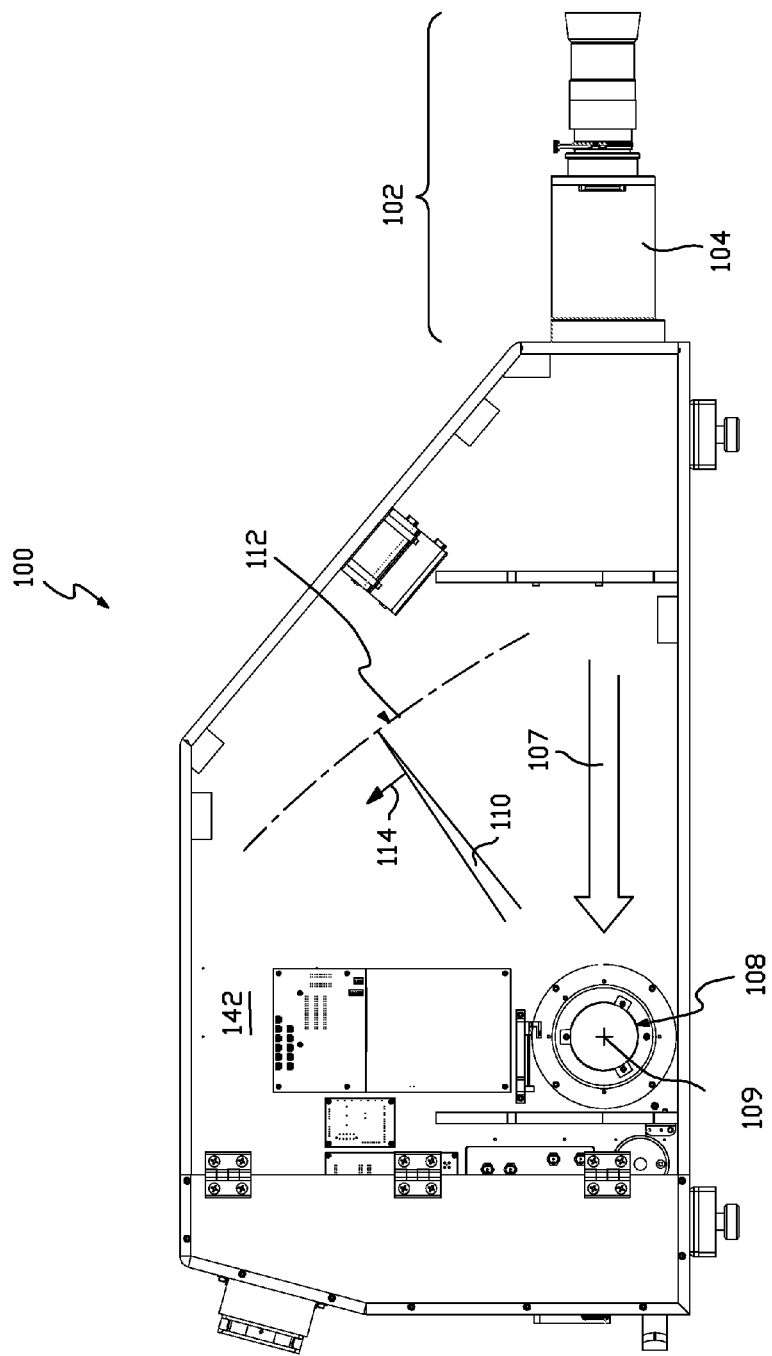
FIG. 2 is a side view of the embodiment in FIG. 1 with certain elements removed for clarity of illustration.
Figure 3:
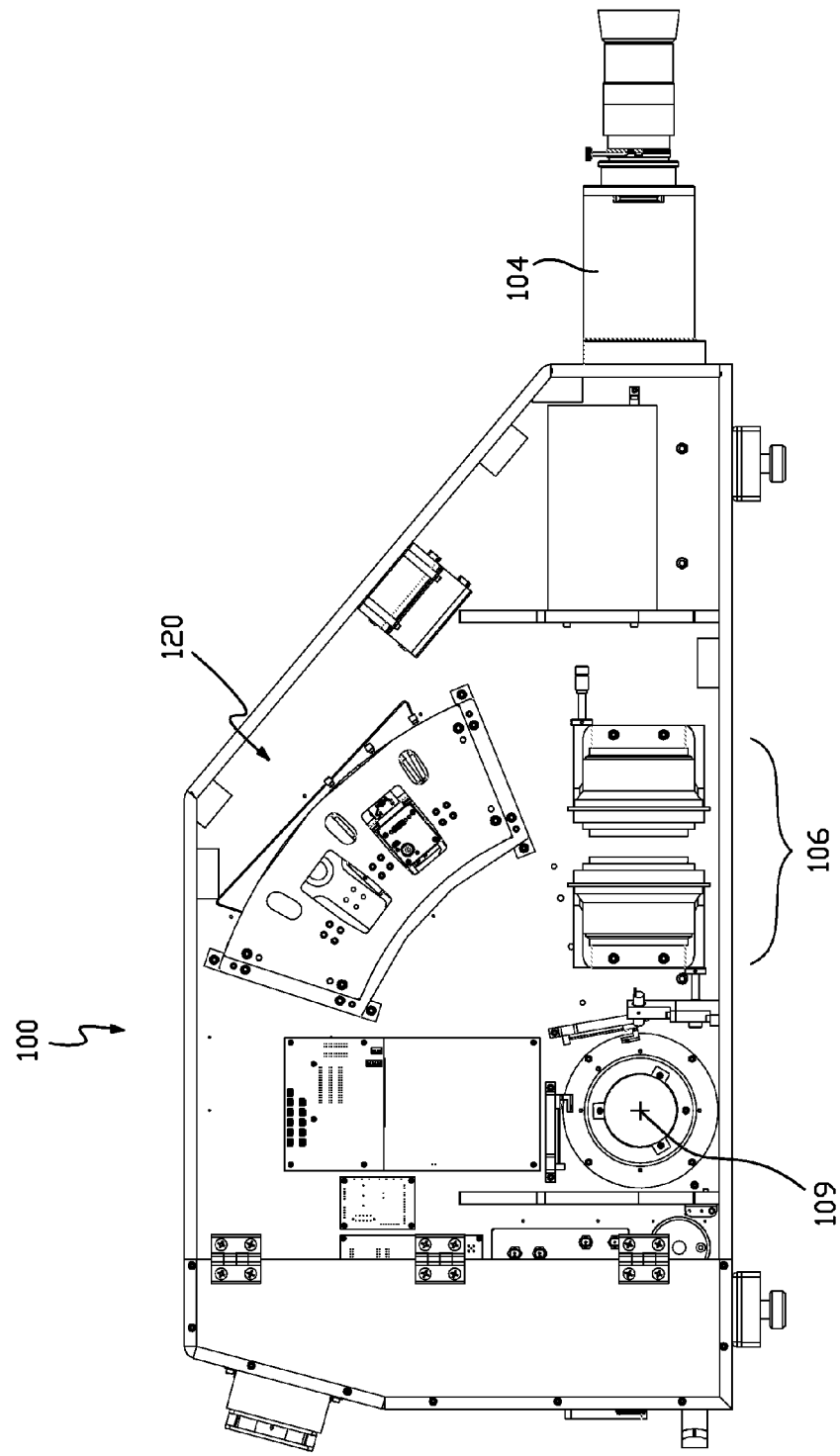
FIG. 3 is a side view of the embodiment in FIG. 1.
Figure 4:
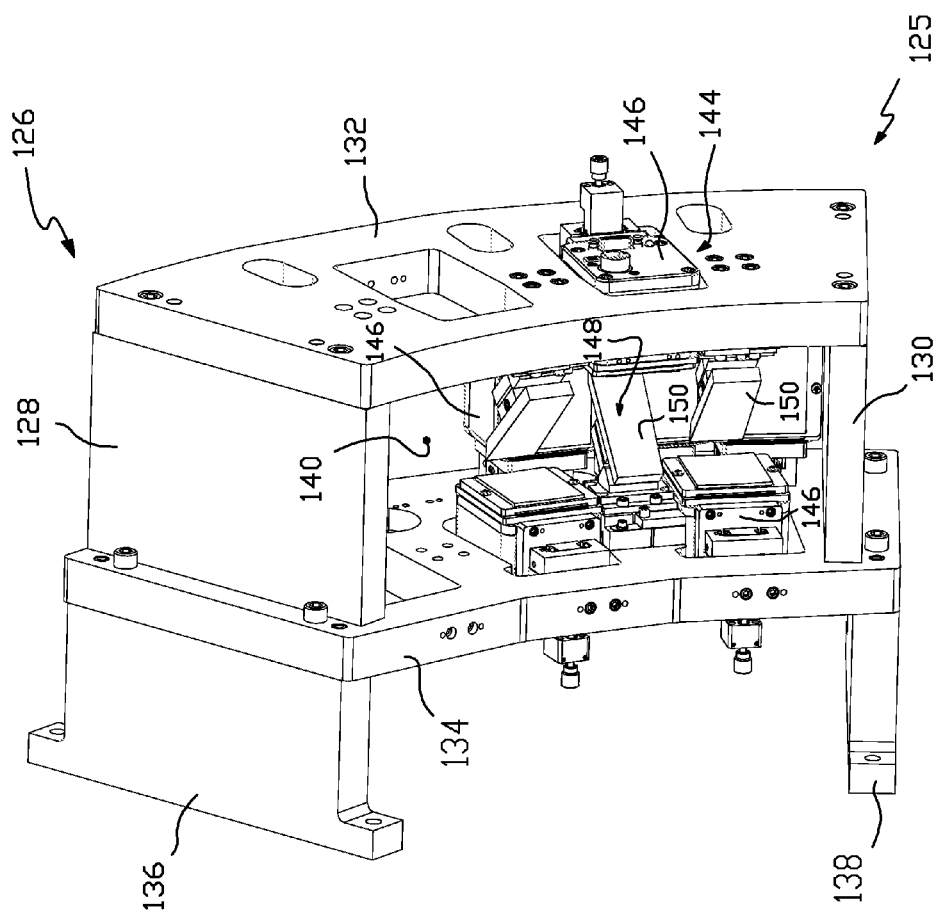
FIG. 4 is a perspective view of a workable digital image collection assembly.
Figure 5:
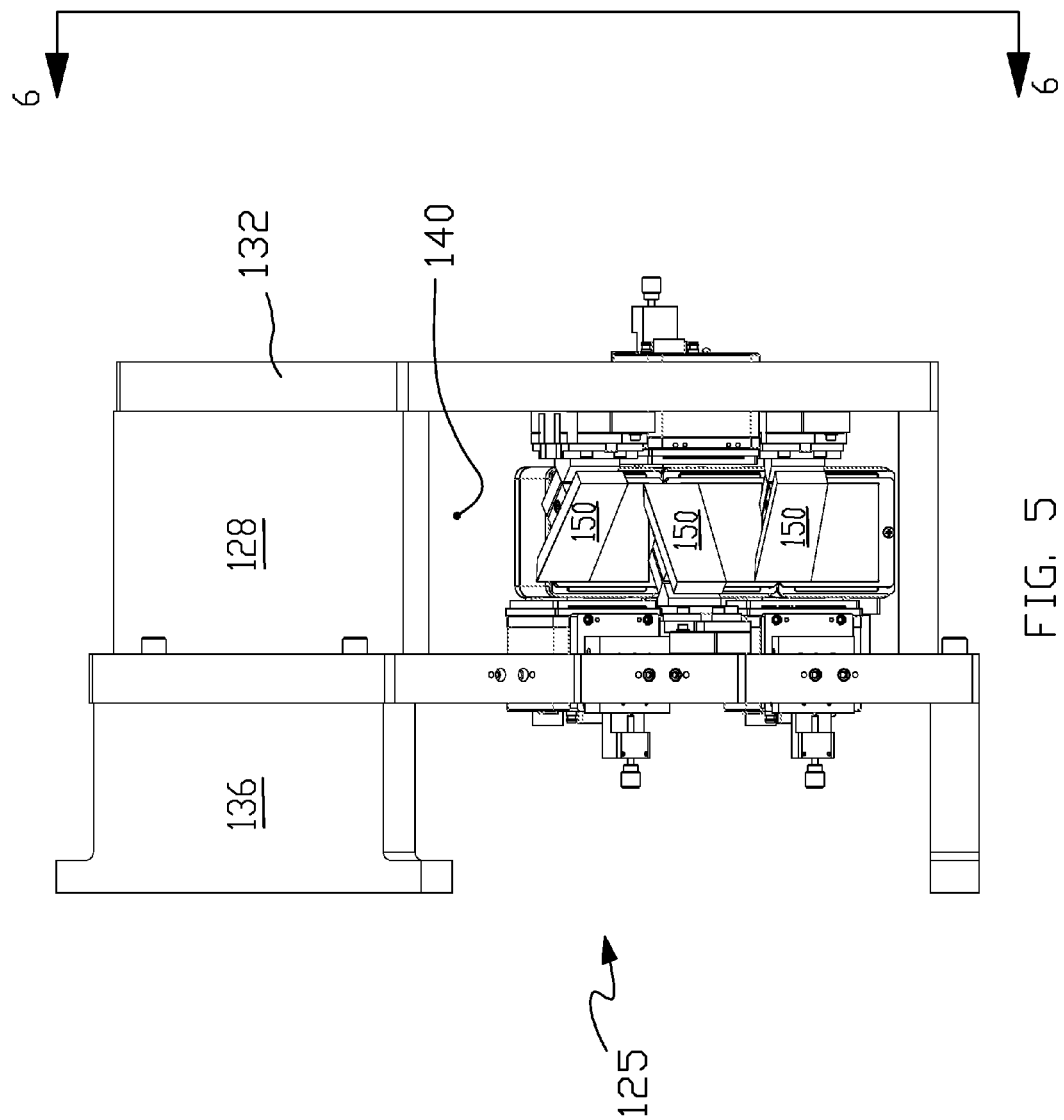
FIG. 5 is a front view, indicated by section 5-5 in FIG. 6 and looking in the direction of the arrows, of the digital image collection assembly in FIG. 4.
Figure 6:
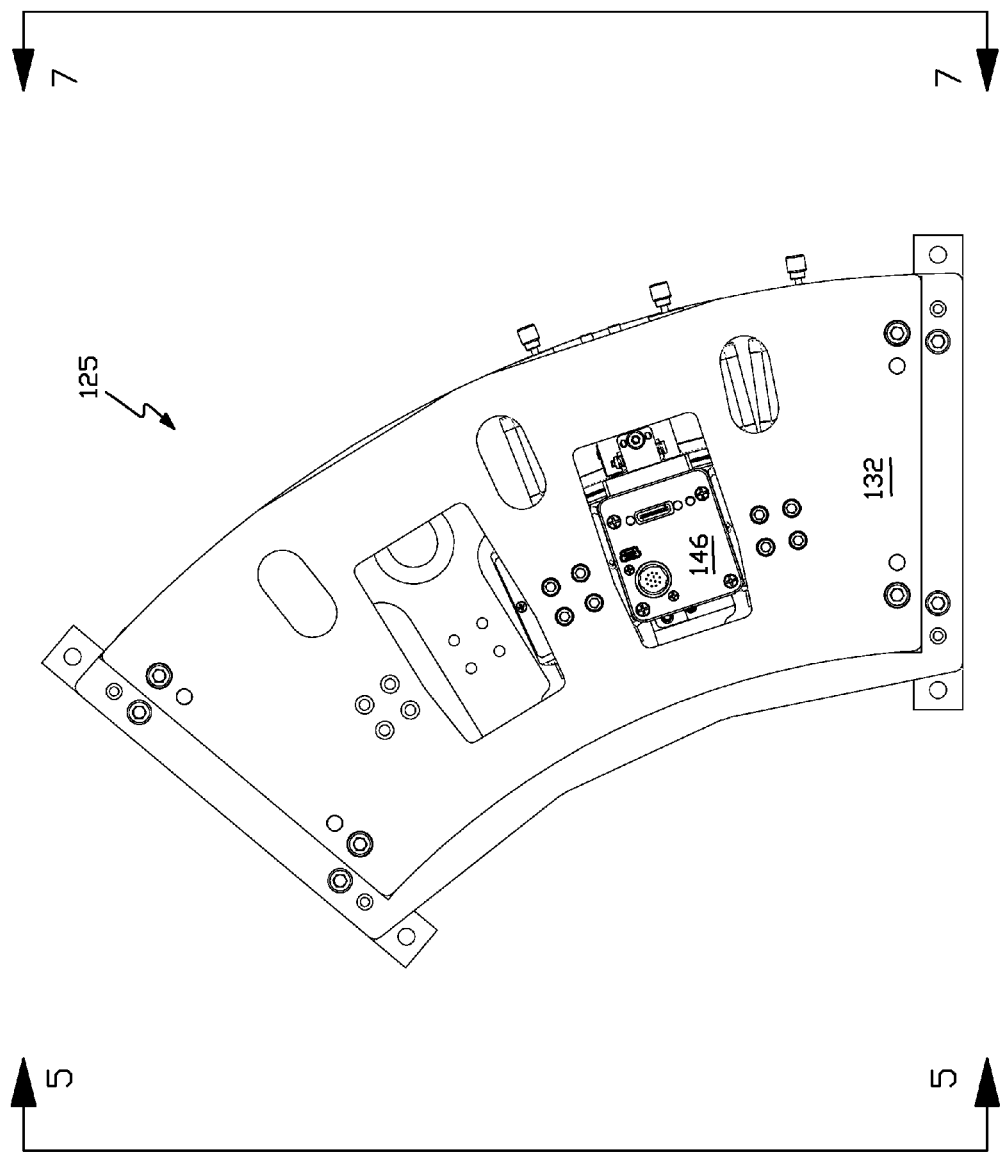
FIG. 6 is a side view, indicated by section 6-6 in FIG. 5 and looking in the direction of the arrows.
Figure 7:
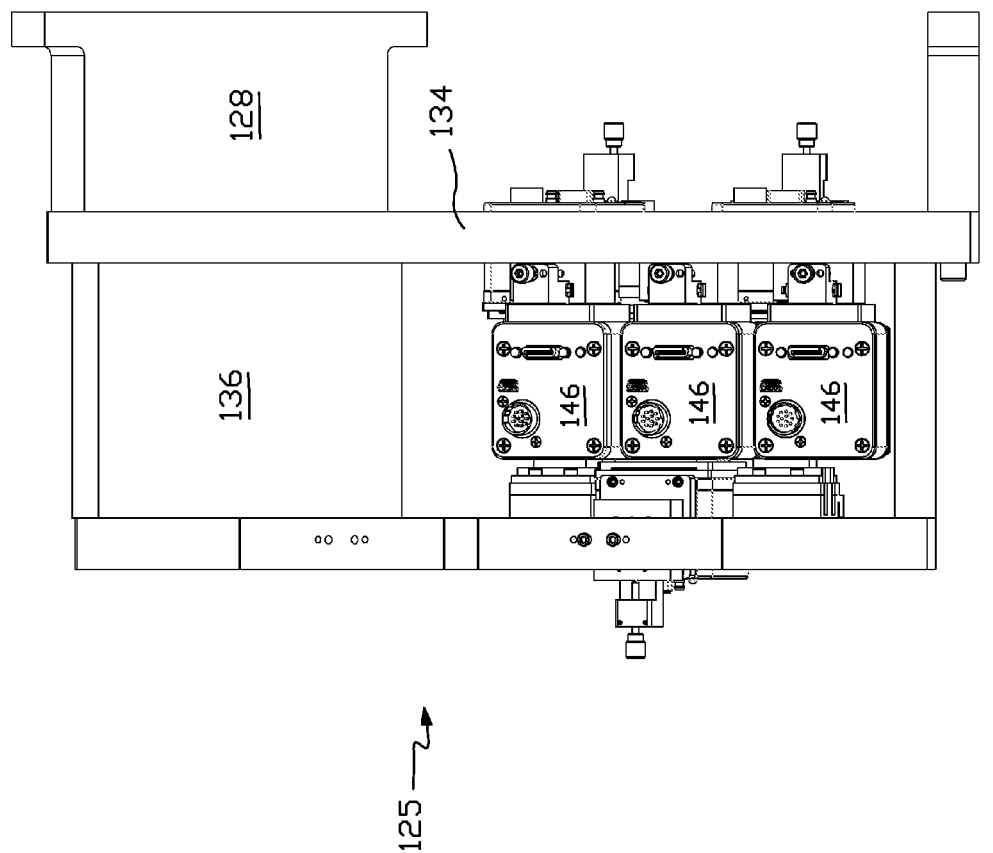
FIG. 7 is a rear view, indicated by section 7-7 in FIG. 6 and looking in the direction of the arrows.

FIGS. 1 through 3 illustrate details of construction of a currently preferred embodiment of a streak camera, generally indicated at 100. Streak camera 100 includes an objective lens assembly, generally 102, which is adapted to form an image of the subject coincident with the plane of an input slit. The input slit is conventionally embodied as a mechanical slit assembly with horizontal parallel knife edges which block all light into the camera from the subject image except from the narrow line of empty space, or gap, between the knife edges. Desirably, the mechanical slit assembly 104 includes a mechanism effective to adjust the gap size between knife edges.

The image relay optics 106 typically includes a lens, or more typically a multi-element lens grouping, configured to relay an acquired image light bundle 107, representing the line image of the subject, from the slit onto a rotating mirror assembly, generally 108. The image light bundle 107 is reflected by a mirror that rotates about axis 109, and the reflected light bundle 110 is focused on the conventional image plane indicated at 112 in FIG. 2. Rotation of the mirror about axis 109 sweeps the reflected light bundle 110 across the conventional image plane 112, as indicated by arrow 114. Of course, sweep direction 114 is determined by the direction of rotation of the mirror in assembly 108. A commercially available workable rotating mirror assembly 108 includes model 1227, available from the Cordin Company, having a place of business located at 2230 S. 3270 W., Salt Lake City, Utah 84119.

Camera 100 may be characterized as including an optical image relay system structured to reflect a light bundle 107 effective to sweep a focused line image across an approximately cylindrical conventional image plane 112. A film-based streak camera would provide a length of film disposed in that image plane 112 to record the swept image. As seen in FIG. 3, it is currently preferred to configure and arrange a digital image collection assembly, generally 120, to capture the image that would be swept along the conventional image plane 112.

An exemplary digital image collection assembly is indicated generally at 125 in FIGS. 4 through 8. A suspension cage, generally indicated at 126, is provided as a substrate to which various constituent elements may be anchored at desired orientations inside a camera, such as streak camera 100. The illustrated cage 126 includes walls 128, 130, a top 132, and a bottom 134. Standoffs 136, 138 are provided to locate input window 140 at a desired distance from the rear wall 142 (see FIG. 2) of the camera housing. Partly for convenience of manufacturing, walls 128, 130 are orthogonal to top 132 and bottom 134. Alternative angular arrangements are workable, but generally present more complicated manufacturing considerations.

Suspension cage 126 carries a plurality of digital image sensors, generally 144. An exemplary digital image sensor includes illustrated sensor 146, which is a Kodak KAI-29050 CCD sensor. Alternative workable digital image sensors non-exclusively include high resolution CCD sensors from vendors such as Sony, Dalsa, etc.

Suspension cage 126 also carries a plurality of optical interruption elements, generally 148. An exemplary optical interruption element includes illustrated mirror 150, which is a highly polished, lapped brass substrate, enhanced aluminum overcoat first surface mirror custom fabricated for this application. Commercial first surface mirrors from vendors such as Melles-Griot, Edmund Optics, etc., can be used interchangeably if custom cut to the proper shape. Desirably, mirrors 150 have a reflective surface whose outline is roughly trapezoidal so light reflected from a mirror 150 will impinge on an area of an image sensor that is at least roughly rectangular. It is also currently preferred for the side edges of a mirror 150 to be oriented at less than 90 degrees from the reflection surface, to present a sharp edge on the reflective surface and to avoid scattering reflection of light by the edge surface, itself. Alternative workable optical interruption elements nonexclusively include prisms, beam splitters, and other elements capable of redirecting a beam of light.

Operation of the illustrated embodiment will now be explained. Broadly, a reflected light bundle (e.g. see 110 in FIG. 2) is directed into input window 140 to sweep a focused image along an interrupted image plane. One or more segment of that interrupted image plane is disposed in the conventional image plane 112 and captured by one or more sensor 146 having an image-capture surface disposed approximately in agreement with the conventional image plane 112. One or more other segment of that interrupted image plane is translated and captured by one or more image sensor disposed at one or more alternative location removed from the conventional image plane. An image, representative of the uninterrupted image that would have been formed in the conventional image plane 112, can be formed by concatenating the captured image segments.

Figure 8:
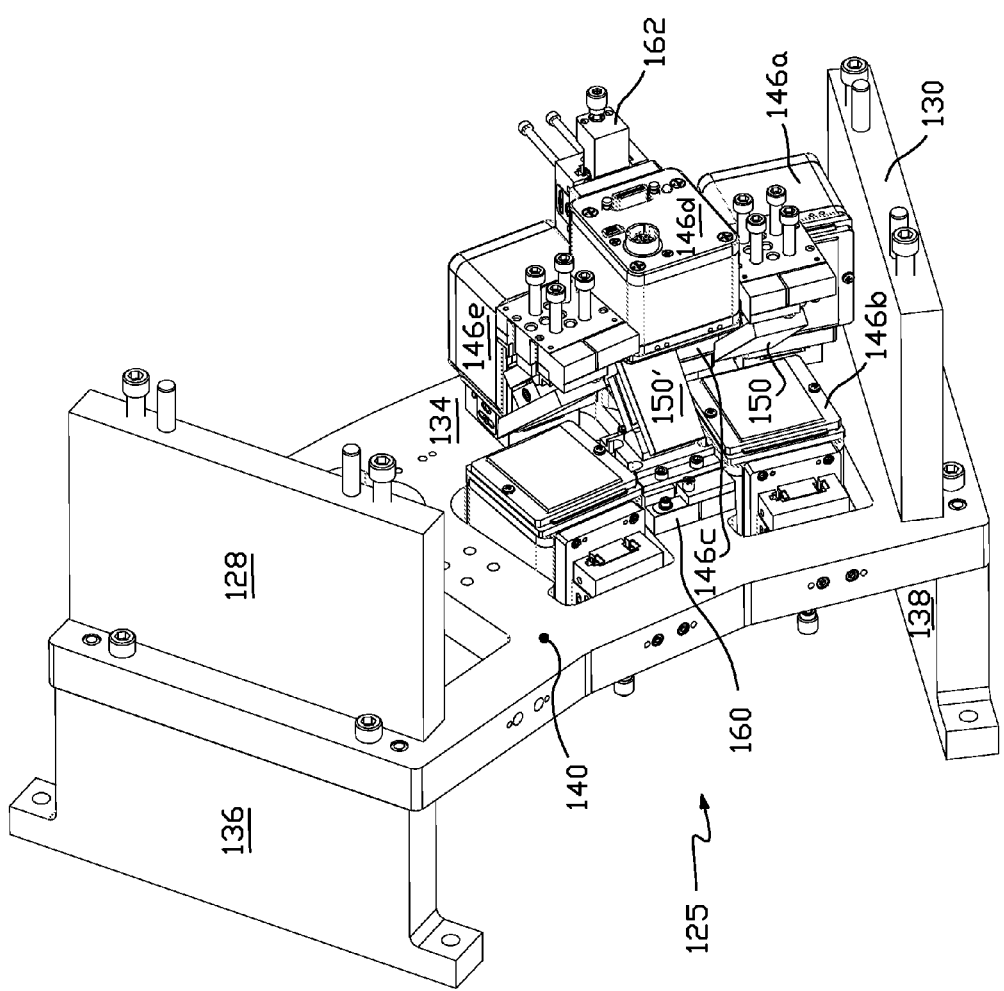
FIG. 8 is a close-up view in perspective of the assembly in FIG. 4, but with a portion of the suspension cage removed.

Reference will now be made to FIG. 8. In detail, a reflected light bundle 110 can be directed through input window 140 to first impinge onto digital sensor 146a. As illustrated, sensor 146a has its image-capturing surface oriented at least approximately in agreement with a portion of the conventional image plane. As light bundle 110 sweeps along responsive to rotating mirror assembly 108, sensor 146a captures a first segment of image that is presented to the conventional image plane.

As the focused and reflected light bundle 110 is swept further along, it encounters mirror 150. Mirror 150 is an exemplary optical interruption element disposed between the camera's image relay system and the conventional image plane 112. As the reflected light bundle 110 sweeps across the mirror 150, a second segment of the conventional image plane is effectively translated (e.g. by another reflection from mirror 150) to focus a translated swept image segment onto an alternative image plane that is at least approximately aligned in harmony with the image-capturing surface of sensor 146b. Sensor 146b captures a second consecutive segment of the image that would have been presented to the conventional image plane 112. As illustrated, the alternative (translated) image plane represented by the capture-surface of sensor 146b is disposed at a location that is removed from the conventional image plane 112.

After the bundle 110 leaves mirror 150, it impinges onto sensor 146c, which again has its image-capture surface disposed at least approximately in harmony with the conventional image plane 112. Therefore, sensor 146c captures a third consecutive segment of the image carried in light bundle 110.

Continuing to sweep, the light bundle 110 then encounters mirror 150', and a fourth consecutive segment of the image that would have been presented to the conventional image plane 112 is effectively translated for capture by the image-capturing surface of sensor 146d. After the bundle 110 leaves mirror 150', it impinges onto sensor 146e, which is again disposed at least approximately in harmony with the conventional image plane to capture the image from a fifth consecutive and adjacent segment of the conventional image plane. This process can continue along an array of multiple digital image sensors and optical interruption elements having a desired total (concatenated) length.

With continued reference to FIG. 8, it is currently preferred to provide mounting structure for a mirror, such as mirror 150', that permits fine-tuning the aim of the light bundle reflected from mirror 150'. The illustrated mounting mechanism 160 permits tilting and tipping mirror 150' about orthogonal axes. An exemplary mounting mechanism 160 includes the Siskiyou 50.5cr-T linear stage from Siskiyou Corporation, Grants Pass, Oreg. USA.

Still with reference to FIG. 8, it is convenient to provide mounting structure for an image sensor that permits fine-tuning the sensor's anchored location. The illustrated anchor mechanism 162 permits controlled movement of an image sensor along an axis effective to adjust the sensor's image-capture surface for disposition in a desired focal plane. Careful machining and orthogonality of a suspension cage 126 assist in obtaining a workable alignment of components. An exemplary anchor mechanism 162 includes the Thorlabs MS1 translation stage from Thorlabs, Newton, N.J., USA.

With reference now to FIG. 9, an image light bundle 107 is reflected by rotating mirror assembly 108 to direct reflected light bundle 110 to focus an image on a conventional image plane 112. Reflected light bundles 110, 110', and 110" represent the reflected light bundle at successive discreet locations. The sweep direction 114 is equivalent to a temporal axis for the image presented to the image plane 112.

As indicated by image-capture surface 166 in FIG. 10A, a segment of the image presented to image plane 112 may be directly captured by a digital image sensor. However, it can be seen that portions of the resulting image will be somewhat out of focus. The illustrated capture-surface is disposed tangent to the image plane 112 at its center, so the captured image will fade in and out of focus as the reflected light bundle sweeps from 110 to 110' and then to 110". Alternatively, the image capture surface 166 can be adjusted along an axis toward the mirror assembly 108 effective to "split the difference", forming two locations where the image is in perfect focus, and three zones of focus error. In certain situations, one of the aforementioned arrangements may be sufficient to capture a workable image.

However, it is currently preferred to provide a flattening lens to adjust the image presented to the curved image plane 112 to the flat image-capture surface 166 present in commercially available image sensors. As illustrated in FIG. 10B, a flattening lens 168 may be disposed to correct focus of the reflected light bundle 110 such that the focus is at least substantially uniform across the image capture surface 166. A workable lens 168 includes a cylindrical lens.

FIGS. 11A, 11B, and 11C represent successive segments of images captured by successive image sensors. First image segment 172 is captured on image capture surface 166 of a first image sensor. Second image segment 174 is captured on image capture surface 166 of a second image sensor. Third image segment 176 is captured on image capture surface 166 of a third image sensor. One or more of such image segments is obtained from a translated first swept image segment at an alternative image plane removed from a conventional image plane.

As illustrated in exemplary FIG. 11A, each image sensor includes a number of pixels, generally indicated at 178. Desirably, each image sensor will include more pixels (in both the length direction "L" and the temporal direction "t") than required to capture a desired image segment.

Because the optical interruption element 148 is disposed to interrupt light bundle 110 away from a focus point, a trailing band 180, and a leading band 182, can be formed as the image-forming light bundle 110 transitions to (or from) an optical interruption element 148. The bands 180, 182 contain coincident image data that can be used to orient adjacent image segments when concatenating successive captured image segments to form a combined image, generally 190 in FIG. 12. The overlapping coincident image data in bands 180, 182 can be used to define the boundary 192 between concatenated images. Software can be employed to transversely offset and rotate (if, and as required) individual pixel positional components in the discreet arrays of data collected by pixels 178 of each image sensor. The resulting image 190 represents the image that would have formed on consecutive segments 194 of a conventional image plane 112 in a film-based streak camera. However, image 190 also provides an added advantage in convenience, repeatability, analysis, manipulation, and storage afforded by digital imaging.

FIGS. 13 and 14 illustrate an alternative arrangement forming a workable image relay system and digital image acquisition array for a digital streak camera. The arrangement generally indicated at 200 includes a beam splitter 202 disposed to divide input image light bundle 107. A portion 107' of light bundle 107 passes through the beam splitter 202 and is reflected from rotating mirror 203, forming bundle 110 directed toward image plane 112. A portion of input light bundle 107 is reflected by beam splitter 202 and again from reflective element 204 as bundle 107", and is reflected from rotating mirror 203, forming bundle 110'" directed toward image plane 112'. A reflective element could be, for non-limiting examples, a mirror, beam splitter, or prism.

Sequential segments 194 of each image plane may be captured by image acquisition elements that are indicated in general by sequential cubical elements 208. An acquisition element 208 may be, for non-limiting examples, an image sensor or an optical interruption element in workable combination with an image sensor. Note that image planes 112 and 112' may be spaced apart by a distance determined by spacing 210 between reflective elements 202 and 204. Image acquisition elements 208 disposed along each of plane 112 and 112' may be sequenced with respect to each other in the temporal direction "t", as illustrated. In such configuration, duplicate images may be formed and effectively "stacked" on top of one another by software and a computing device in a concatenating process to generate a combined image, such as image 190 in FIG. 12.

FIG. 15 illustrates an alternative workable optical relay system. Input light bundle 107 is reflected from rotating mirror 203 to direct light bundle 110a toward an optical interruption element 148. Illustrated optical interruption element 148 is a prism 214. In a further alternative arrangement, optical interruption element 148 could be a beam splitter, or other element or assembly operable to direct light bundle 110b toward an image acquisition element 208.

While the invention has been described in particular with reference to certain illustrated embodiments, such is not intended to limit the scope of the invention. The present invention may be embodied in other specific forms without departing from its spirit or essential characteristics. The described embodiments are to be considered as generally illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
    image relay optics configured to relay a light bundle representing a line image of a subject;
    an image relay system structured to reflect said light bundle effective to sweep a focused image of said line image across a conventional image plane;
    a first optical interruption element operable to focus a translated first swept image segment onto an alternative image plane removed from said conventional image plane; and
    a first image sensor disposed to receive said translated first swept image segment as an input signal comprising said first swept image segment;
    a second image sensor disposed to receive a second swept image segment as an input signal comprising said second swept image segment, wherein:
    said second swept image segment is disposed adjacent to said first swept image segment to comprise a substantial continuation in time of an image contained in said first swept image segment;
    a second optical interruption element disposed between said image relay system and said conventional image plane and operable to focus a translated third swept image segment at an alternative position removed from said conventional image plane;
    a third image sensor disposed to receive said translated third swept image segment as an input signal comprising said third swept image segment; and wherein
    said third swept image segment is disposed adjacent to said second swept image segment to comprise a substantial continuation in time of an image contained in said second swept image segment.

2. The apparatus according to claim 1, wherein:
    an image acquisition surface of said second image sensor is orthogonal to an image acquisition surface of said first image sensor.

3. The apparatus according to claim 1, wherein:
    an image acquisition surface of said second image sensor is disposed at least approximately in said conventional image plane.

4. The apparatus according to claim 1, wherein:
    an image acquisition surface of said third image sensor is disposed orthogonal to an image acquisition surface of said second image sensor.

5. The apparatus according to claim 4, wherein:
    an image acquisition surface of said third image sensor is disposed parallel to an image acquisition surface of said first image sensor.

6. The apparatus according to claim 1, wherein:
    an image acquisition area of said first image sensor is larger than required to capture the temporal length of said first translated swept image segment;
    an image acquisition area of said second image sensor is larger than required to capture the temporal length of said second swept image segment; and
    said first optical interruption element is disposed to create optical redundancy between a portion of captured image extending from the leading edge of said second swept image segment and the trailing edge of the preceding translated first swept image segment.

7. The apparatus according to claim 1, in combination with software and a computing device for digitally stitching successive adjacent captured image segments to concatenate said successive adjacent captured image segments and create an uninterrupted image representative of that which would have been projected onto said conventional image plane; wherein:

said uninterrupted image represents an uninterrupted temporal record of a length of said line image spanning across more than one sensor.

8. The apparatus according to claim 1, wherein:
said first optical interruption element comprises a first surface mirror.

9. The apparatus according to claim 1, wherein:
said first optical interruption element comprises a reflecting prism.

10. The apparatus according to claim 1, wherein:
an optical element disposed in the path of said light bundle comprises a beam splitter.

11. The apparatus according to claim 1, further comprising:
an optical element disposed in operable association with the data acquisition surface of said first image sensor effective to translate a focused image from said alternative image plane to the effective plane of data acquisition of said first image sensor.

12. The apparatus according to claim 11, wherein;
said optical element comprises a cylindrical lens.

13. The apparatus according to claim 12, wherein;
said optical element comprises a fused fiber optic plate having a negative cylindrical profile in one axis, fibers in said plate being aligned and oriented to translate said image from a receptor surface to a transmitter surface, said transmitter surface being arranged to convey said image to said first image sensor.

\* \* \* \* \*